United States Patent
Low et al.

(10) Patent No.: US 9,527,207 B2
(45) Date of Patent: Dec. 27, 2016

(54) DEXTEROUS TELEMANIPULATOR SYSTEM

(75) Inventors: Thomas P. Low, Belmont, CA (US); Pablo E. Garcia, Menlo Park, CA (US); Bruce H. Knoth, San Carlos, CA (US); Cregg Cowan, Mountain View, CA (US); Bryan Chavez, Palo Alto, CA (US)

(73) Assignee: SRI International, Menlo Park, CA (US)

(*) Notice: Subject to any disclaimer, the term of this patent is extended or adjusted under 35 U.S.C. 154(b) by 90 days.

(21) Appl. No.: 14/005,075

(22) PCT Filed: Mar. 21, 2012

(86) PCT No.: PCT/US2012/029854
§ 371 (c)(1),
(2), (4) Date: Oct. 18, 2013

(87) PCT Pub. No.: WO2012/129251
PCT Pub. Date: Sep. 27, 2012

(65) Prior Publication Data
US 2014/0031983 A1 Jan. 30, 2014

Related U.S. Application Data

(60) Provisional application No. 61/466,902, filed on Mar. 23, 2011, provisional application No. 61/466,904, filed on Mar. 23, 2011.

(51) Int. Cl.
G05B 19/04 (2006.01)
G05B 19/18 (2006.01)
(Continued)

(52) U.S. Cl.
CPC ............... *B25J 9/06* (2013.01); *B25J 9/0087* (2013.01); *B25J 9/161* (2013.01); *B25J 9/1689* (2013.01); *B25J 13/025* (2013.01); *B25J 19/023* (2013.01)

(58) Field of Classification Search
CPC combination set(s) only.
See application file for complete search history.

(56) References Cited

U.S. PATENT DOCUMENTS

| 4,733,576 A | 3/1988 | Zimmer et al. |
| 4,736,826 A | 4/1988 | White et al. |

(Continued)

FOREIGN PATENT DOCUMENTS

| EP | 1973021 B1 | 4/2012 |
| JP | S58181590 A | 10/1983 |

(Continued)

OTHER PUBLICATIONS

International Preliminary Report on Patentability in related international patent application No. PCT/US12/29854, mailed on Oct. 3, 2013; 7 pages.

(Continued)

*Primary Examiner* — Bhavesh V Amin
(74) *Attorney, Agent, or Firm* — Schmeiser, Olsen & Watts LLP

(57) ABSTRACT

A robotic manipulator has a body and a stereoscopic video system movably coupled to the body. The stereoscopic vision system produces a stereoscopic video of an environment of the robotic manipulator. The robotic manipulator also includes two independently remotely controlled arms coupled to opposite sides of the body. Each arm moves in proprioceptive alignment with the stereoscopic video produced by the stereoscopic video system in response to commands received from a remote control station based on movements performed by an operator at the remote control station.

19 Claims, 10 Drawing Sheets

(51) Int. Cl.
  *B25J 9/06* (2006.01)
  *B25J 9/00* (2006.01)
  *B25J 19/02* (2006.01)
  *B25J 9/16* (2006.01)
  *B25J 13/02* (2006.01)

(56) References Cited

U.S. PATENT DOCUMENTS

| | | | |
|---|---|---|---|
| 6,671,581 B2 * | 12/2003 | Niemeyer | A61B 19/22 600/109 |
| 6,963,792 B1 | 11/2005 | Green | |
| 7,198,630 B2 | 4/2007 | Lipow | |
| 8,833,826 B2 * | 9/2014 | Garcia | B25J 15/0009 294/111 |
| 2002/0022907 A1 | 2/2002 | Takenaka et al. | |
| 2003/0045888 A1 | 3/2003 | Brock et al. | |
| 2003/0060927 A1 * | 3/2003 | Gerbi | A61B 19/22 700/245 |
| 2004/0024311 A1 | 2/2004 | Quaid, III | A61B 19/2203 600/428 |
| 2004/0106916 A1 * | 6/2004 | Quaid | A61B 19/2203 606/1 |
| 2004/0111183 A1 * | 6/2004 | Sutherland | A61B 19/22 700/245 |
| 2006/0142657 A1 * | 6/2006 | Quaid | A61B 17/1764 600/424 |
| 2006/0142896 A1 | 6/2006 | Yokoyama et al. | |
| 2008/0071290 A1 * | 3/2008 | Larkin | A61B 1/00087 606/130 |
| 2008/0168639 A1 | 7/2008 | Otake et al. | |
| 2008/0297590 A1 * | 12/2008 | Barber | G06F 3/013 348/47 |
| 2009/0028670 A1 | 1/2009 | Garcia et al. | |
| 2010/0068024 A1 * | 3/2010 | Agens | B66C 3/18 414/729 |
| 2011/0010013 A1 | 1/2011 | Ruan et al. | |
| 2011/0025821 A1 * | 2/2011 | Curtis | H04N 13/0438 348/43 |
| 2011/0060346 A1 | 3/2011 | Jensen et al. | |
| 2014/0031983 A1 * | 1/2014 | Low | B25J 9/0087 700/257 |

FOREIGN PATENT DOCUMENTS

| | | |
|---|---|---|
| JP | S62501345 A | 6/1987 |
| JP | H02116494 A | 5/1990 |
| JP | H0540907 A | 2/1993 |
| JP | H08224245 A | 9/1996 |
| JP | H0929671 A | 2/1997 |
| JP | H09109069 A | 4/1997 |
| JP | H10230485 A | 9/1998 |
| JP | H11262705 A | 9/1999 |
| JP | 2002166383 A | 6/2002 |
| JP | 2004160594 A | 6/2004 |
| JP | 2006102847 A | 4/2006 |
| JP | 2006167837 A | 6/2006 |
| JP | 2007118176 A | 5/2007 |
| JP | 2008046032 A | 2/2008 |
| JP | 2008228967 A | 10/2008 |
| JP | 2009539573 A | 11/2009 |
| JP | 2010162666 A | 7/2010 |
| WO | 2009143377 A2 | 11/2009 |

OTHER PUBLICATIONS

International Search Report and Written Opinion in related International patent application No. PCT/US2012/029854, mailed on Oct. 19, 2012; 11 pages.
Notification of Reason(s) for Refusal in related Japanese Patent Application No. 2014-501194, mailed on Dec. 8, 2015; 26 pages.
Extended European Search Report in related European Patent Application No. 12760895.1, mailed on Dec. 9, 2014; 9 pages.
Faucher, et al., "Ground Operated Teleoperation System for Live Power Line Maintenance", IEEE International Conference on Systems, Man and Cybernetics, Oct. 14-17, 1996, Beijing, China, pp. 792-798.
Kron, et al., "Haptic Telepresent Control Technology Applied to Disposal of Expolosive Ordinances: Principles and Experimental Results", IEEE International Symposium on Industrial Electronics, Jun. 20-23, 2005, Dubrovnik, Croatia, pp. 1505-1510.
Xu, et al., "System Design of an Insertable Robotic Effector Platform for Single Port Access (SPA) Surgery", IEEE International Conference on Intelligent Robots and Systems, Oct. 11-15, 2009, St. Louis, Missouri, USA, pp. 5546-5552.

* cited by examiner

DEXTEROUS TELEMANIPULATOR SYSTEM

RELATED APPLICATIONS

This application claims priority to and the benefit of U.S. provisional application No. 61/466,902, filed on Mar. 23, 2011, titled "A Mobile Robotic Manipulator System", and U.S. provisional application No. 61/466,904, filed on Mar. 23, 2011, titled "Dexterous Telemanipulator System," the entireties of which applications are incorporated by reference herein.

GOVERNMENT RIGHTS IN THE INVENTION

This invention was made with government support under Contract No. HSHQDC-10-C-00118 awarded by the Department of Homeland Security. The government has certain rights in this invention.

FIELD OF THE INVENTION

The invention relates generally to teleoperated robotic manipulator systems.

BACKGROUND

Teleoperated systems generally include a man-machine interface through which a human operator can remotely control a robotic manipulator. An example of a teleoperated system is the Da Vinci Surgical System, made by Intuitive Surgical of Sunnyvale, Calif. The Da Vinci Surgical System has three robotic arms that operate as tools and a fourth arm that carries a two-lens camera. A surgeon sits at a console and, while looking at the stereoscopic image captured by the robotic arm with the camera, exercises hand controls and/or foot controls that move the other arms. The movements of the controls translate into micro-movements of the instruments. Surgeons have used the Da Vinci Surgical System to perform minimally invasive surgery remotely.

SUMMARY

In one aspect, the invention relates to a robotic manipulator comprising a body and a stereoscopic video system movably coupled to the body. The stereoscopic vision system produces a stereoscopic video of an environment of the robotic manipulator. The robotic manipulator further comprises two independently remotely controlled arms coupled to opposite sides of the body. Each arm moves in proprioceptive alignment with the stereoscopic video produced by the stereoscopic video system in response to commands received from a remote control station based on movements performed by an operator at the remote control station.

In another aspect, the relates to a system comprising a robotic manipulator with a servo actuator subsystem having two independently remotely controlled arms coupled to opposite sides of a body and a video-capture subsystem that produces a stereoscopic video of a local environment of the robotic manipulator. The robotic manipulator further comprises a computational host subsystem that transmits movement commands to the servo actuator subsystem. The commands cause the servo actuator subsystem to move each arm in proprioceptive alignment with the stereoscopic video produced by the video-capture subsystem.

In yet another aspect, the invention relates to a method of remotely operating a robotic manipulator having a body, a stereoscopic video system movably coupled to the body, and two remotely controlled arms coupled to opposite sides of the body. The method comprises capturing, by the video system, a stereoscopic video of an environment of the robotic manipulator, and independently moving, in response to commands received from a remote control station, each arm in proprioceptive alignment with the stereoscopic video produced by the stereoscopic video system.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Applicants recognized that various telemanipulator principles embodied in the Da Vinci Surgical System can be extended to non-medical uses, for example, executing operations within environments hazardous to humans while the operator remains at a remote, safe distance. For example, the robotic manipulator systems described herein can be vehicle-mounted and used to approach, deactivate, and render harmless improvised explosive devices (IED) by bomb squad personnel. Other applications include, but are not limited to, the repair of orbital spacecraft or the capture or stabilizing of orbital objects.

The robotic manipulator systems described herein include a remotely operated robotic manipulator with three-dimensional stereoscopic vision and two independently controllable dexterous hands having multiple degrees of freedom (DOF). The arms of the robot manipulator carry tools or instruments, such as graspers, clamps, cutters, electrical probes, or sensors. The robotic manipulator can serve as an attachment to a coarse-movement vehicle and arm, or operate as a stand-alone unit. Its design is scalable and produces a small form factor that permits the robotic manipulator to enter and operate in tight spaces.

Control of the robotic manipulator, in general, occurs from a remote control station over an RF (radio frequency) link, fiber optic or electrical cable tether. An operator works at the control station with an intuitive human-machine interface through which to perform complex tasks remotely. The control station achieves proprioceptive alignment of stereoscopic imagery with hand controls; that is, the movement of the robotic arms and hands closely corresponds to the movement of the operator's arms and hands. Intuitive telemanipulation also includes motion and rotation clutching, linked camera zoom and movement scaling and transforming movement commands into the camera reference frame for natural, reliable, and predictable operation.

Figure 1:
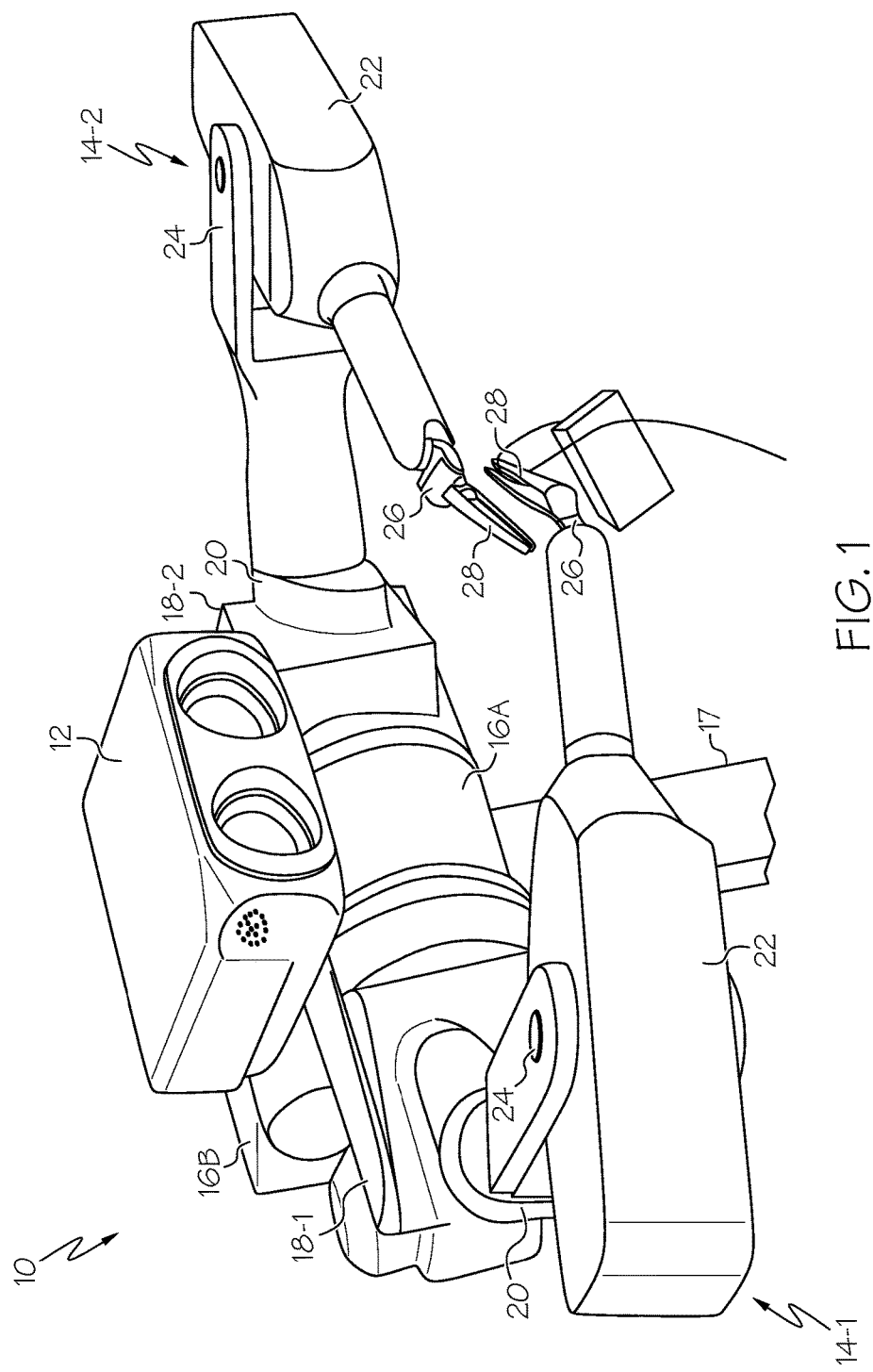
FIG. 1 is a schematic representation of an embodiment of a robotic manipulator with a stereoscopic video system and dexterous independently remotely controlled arms.

FIG. 1 shows an embodiment of a robotic manipulator 10 with a stereoscopic video system 12 and two independently controlled dexterous arms 14-1, 14-2 (generally, 14) movably coupled to a main body or torso having a cylinder-shaped forward portion 16A and a back portion 16B (generally, torso 16). The torso 16 can mount to a mobile EOD (Explosive Ordnance Disposal) platform 17, such as Andros F6-A. The stereoscopic video system 12 is movably coupled to the forward portion 16A of the torso. Preferably, the stereoscopic video system 12 has remote-controlled tilt-zoom-focus capabilities. Embodiments of stereoscopic video system 12 can be standard definition or high-definition (HD).

Each arm 14-1, 14-2 is connected to the cylinder-shaped forward portion 16A of the torso by a respective shoulder 18-1, 18-2 (generally, 18). The shoulders 18 are rotatably connected to opposite sides of the forward portion 16A of the torso. Each arm 14 comprises an upper arm 20 rotatably connected to the shoulder 18, a forearm 22 rotatably connected to the upper arm 20 by an elbow 24, and a wrist 26 rotatably connected to the forearm 22. The wrists 26 can be configured with a variety of changeable tools 28, including, for example, a multi-functional cutter-grasper. The long, slender forearm-to-wrist lessens obstructing the view of the video system 12 to the work site and tool 28. In one embodiment, with both arms engaged, the robotic manipulator 10 is capable of holding approximately a 5-pound payload.

The upper arms 20 can rotate about any of three axes, as described in more detail in connection with FIG. 8. These three axes intersect at a point where the shoulder 18 joins the upper arm 20 (i.e., the shoulder joint). The forearm rotates within the elbow, and the wrist rotates about three perpendicular axes, two of which intersect. The ability to rotate about any of the seven axes corresponds to six degrees of freedom (DOF) of movement for each arm 14: moving forward and backward, moving left and right, moving up and down, tilting forward and backward (pitch), tilting side-to-side (roll), and rotating left and right (yaw). The seventh axis of rotation provides redundancy, and the ability of selecting between many arm configurations when the tool 28 is maintained in a desired position and orientation.

The static design of the robotic manipulator 10 is to have the center of mass of the whole arm 14 at the intersection of the three axes of rotation. Advantageously, this intersection at the shoulder joint ensures the center of mass remains at the shoulder joint throughout the range of 3-dimensional motion of the arm 14. This static balance design promotes stability of the robotic manipulator, enables sensing of the tool and payload forces and not the arm weight, and facilitates efficient dedication of electrical power to the handling of the tool and payload.

Figure 2:
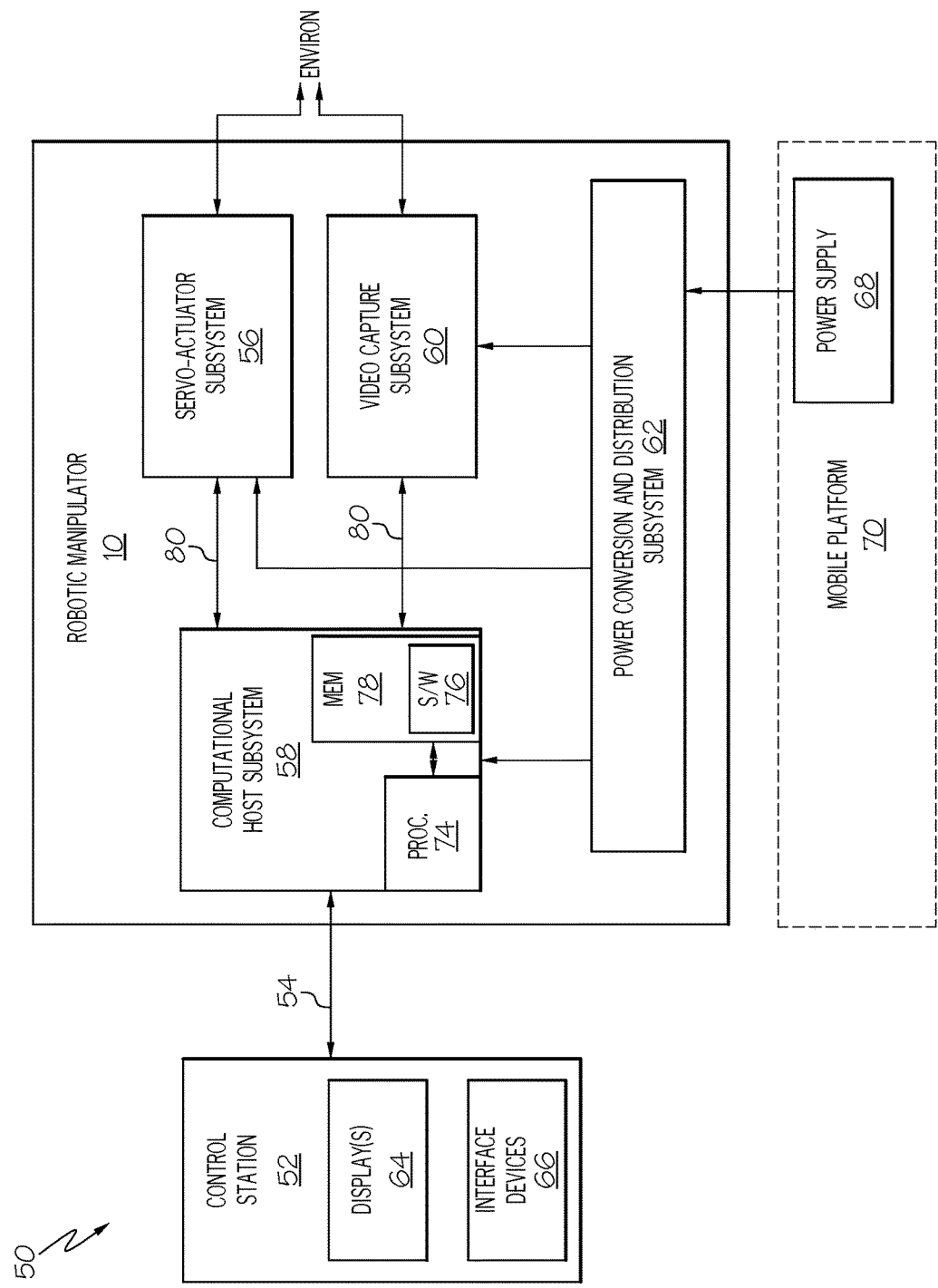
FIG. 2 is a functional block diagram of an embodiment of a teleoperated robotic manipulator system.

FIG. 2 shows a functional block diagram of a teleoperated robotic manipulator system 50 including a control station 52 in communication with the robotic manipulator 10 over a communication link 54. The communication link 54 can be, for example, a fiber optic cable (10Base T), Ethernet cable, or a RF communication link. The robotic manipulator 10 also includes a servo actuator subsystem 56, a computational host subsystem 58, a video-capture subsystem 60, and a power conversion and distribution subsystem 62.

Through the control station 52, the operator can reposition the robotic manipulator 10, individually control the robotic arms 14 simultaneously, and execute camera operations, such as tilt, zoom, motion scaling, tremor filtering, and stereo convergence. Dynamic adjustment to the convergence angle provides comfortable stereoscopic viewing through a wide range of operating depths. In brief overview, the controls station 52 comprises computational elements (e.g., processor, memory, software, network interface) for translating interface device movements into command data packets, transmitting the commands to the robotic manipulator, performing hardware-accelerated decompression of video arriving from the robotic manipulator, presenting graphical interface overlays and haptic displays for notifying the operator of the limits of the workspace and of any impending collisions with remote structures.

In brief overview, the control station 52 provides operator feedback in the form of haptic forces on three axes, tactile vibration on three axes, a sense of tool-grip effort, and a three-dimensional binocular view. The control station 52 includes a stereoscopic display 64 (preferably capable of high-definition) and haptic-interface devices 66. The display can be implemented with a pair of 15-inch diagonal LCD displays with a 1024×800 resolution, for example. Alternatively, the display 64 can be a SXGA resolution (1280×960) Organic LED micro-display produced by eMagin Corporation of Bellevue Wash. Other display alternatives include LCD panels with 120 Hz refresh rate and active LCD shuttered glasses, or 3D displays using filters and passive glasses.

The haptic-interface devices 66 can be implemented with Omega7 desktop haptic interface devices (manufactured by Force Dimension of Nylon, Switzerland), or with a bimanual interface device produced by Mimic Technologies of Seattle, Wash. The Mimic desktop device uses tensioned cables connecting the control handles to measure position and to exert forces to the operator. Servomotors attach to spools that control the tension in the cables. The dual operator hand-control haptic-interface devices 66 provide six-DOF movement (left, right, back, forward, up, and down) and a proportional gripper control. Vibrotactile feedback based on 3-axis accelerometers embedded in each manipulator gripper (FIG. 12) is reproduced as resolved forces in the haptic-interface devices 66. Low-pass filtering of the command signals originating from the haptic-interface devices 66 prevents destabilization in the presence of arbitrary latencies.

As an alternative to the haptic-interface devices described, in a low cost implementation, a pair of 6 axis joystick devices (e.g., SpaceNavigator™ by 3DConnexion of Boston, Mass.) may be used to provide movement commands to the control station. These devices presently do not support the display of haptic forces.

In addition, use of low-latency hardware accelerated video CODECs, for long distance operation using satellite communication techniques, and the collocation of telepresence operations with the communications facilities helps minimize communication latency. To compensate for long round-trip latencies (e.g., greater than 750 ms), the control station 52 can present a display overlay that shows the commanded configuration of the remote arm with minimal delay in order to aid the operator in correctly placing the tools of the robotic manipulator at a desired target without overshoot or hesitation. To the operator, the robotic manipulator appears to move in immediate real-time response to the movement of the haptic-interface devices. In addition, deliberately delaying the vibrational haptic feedback in order to synchronize the feedback with the decoded video can help avoid inconsistent sensory queues that convey a sense of telepresence.

The servo actuator subsystem 56 comprises the various servomotors, encoders, closed-loop position controllers, power amplifiers, and network communication elements of the robotic manipulator 10.

The computational host subsystem 58 translates commands received over the communications link 54 into low-level instructions for the servo actuator subsystem 56, translates and sends feedback signals received from the servomotors to the control station 52, and collects, compresses, and transmits video data from the cameras of the video-capture subsystem 60 to the control station 52 for display.

The computational host subsystem 58 includes a processor 74 that executes communications and embedded software 76 (stored in memory 78) to direct the functionality of the robotic manipulator 10, such as the ability to deploy and stow autonomously, and to calculate rapidly the movement required of each manipulator joint to achieve the motion required by a received command from the control station 52. The software 76 translates these required movements into instructions expected by the various components of the servo actuator subsystem 56 and video-capture subsystem 60. The computational host subsystem 58 communicates these instructions to each subsystem 56, 60 through standard communications channels 80, such as USB 2.0, CANBus, or EtherCAT. As an example, commands can be sent to the servo actuator subsystem 56 at 20-500 positions per second.

In the absence of position updates from the operator, individual joints of the arms 14 hold their last commanded positions. The various levels of counterbalancing designed into the shapes and locations of the "body parts" of the robotic manipulator and the program algorithms employed to maintain the balance throughout their ranges of motion, as described in more detail below, enable the robotic manipulator to hold these positions using minimum electrical power. An objective of the embedded software 76 is for the arms to remain substantially balanced through a large workspace, which, for example, can measure 42 inches in width by 25 inches in depth by 33 inches in height.

The software 76 also collects feedback information from the servo actuator and video capture subsystems 56, 60, translates and encodes the feedback information, and transmits the encoded data to the control station 52 over the communication link 54. The embedded software 76 can also detect and handle fault conditions, allowing recovery whenever possible.

The video-capture subsystem 60 acquires stereoscopic images of the remote environments, and responds to commands from the computational host subsystem 58 to adjust zoom, focus, or camera convergence. In one embodiment, the video-capture subsystem 60 supports VGA (640×480) stereoscopic video. Other capabilities can include higher display resolution and remote adjustment of zoom, focus, convergence, and stereo baseline.

The power conversion and distribution subsystem 62 can draw power from an external power source 68, here, for example, shown to be part of a mobile host platform 70 to which the robotic manipulator 10 is mounted, and transforms this power into the electrical voltage and current levels required by the various dependent electronic subsystems 56, 58, and 60.

Figure 3:
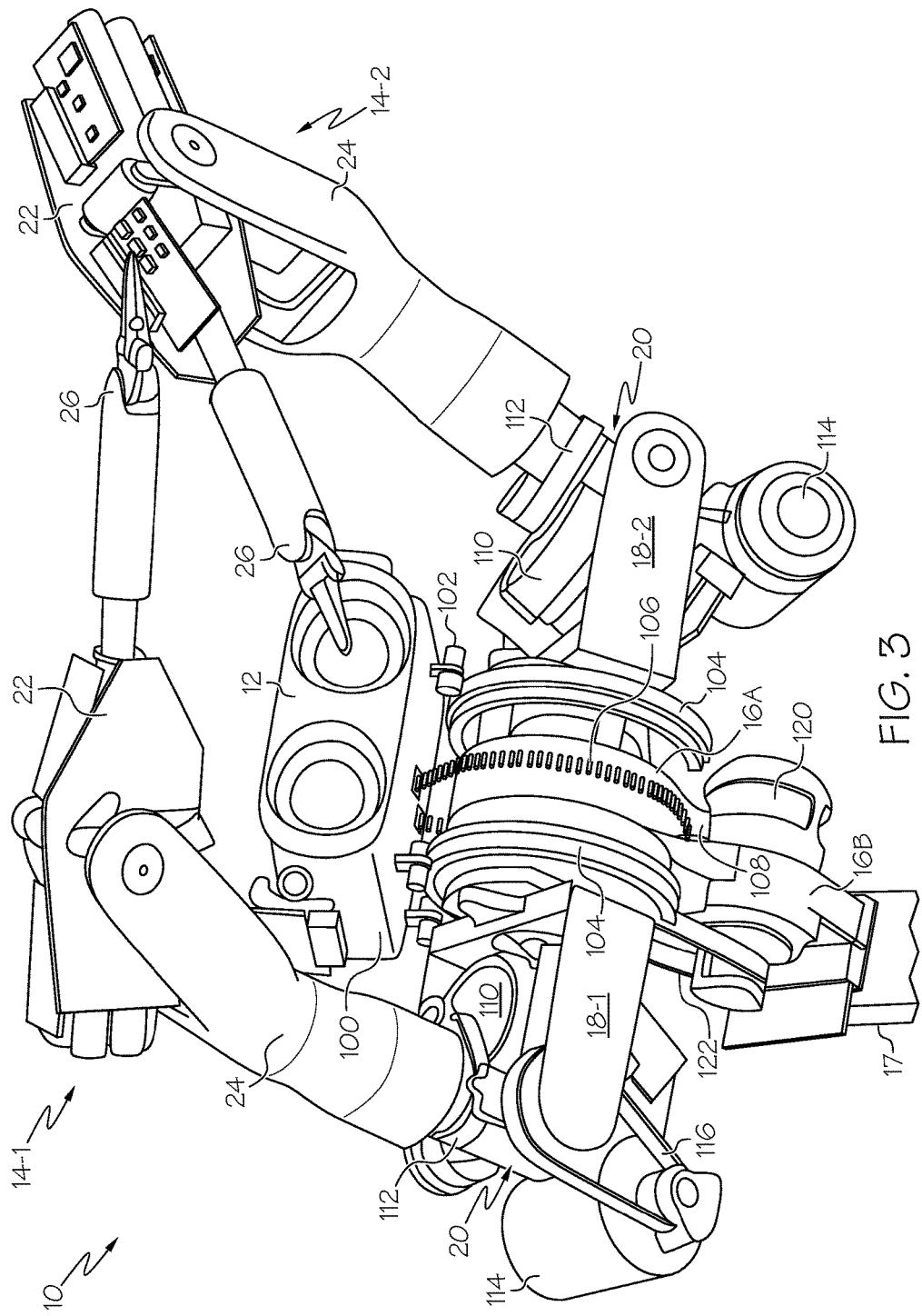
FIG. 3 is a diagram of an embodiment of the robotic manipulator without protective covering.

FIG. 3 shows a view of the robotic manipulator 10 without protective covering. The stereoscopic video system 12 has an undercarriage 100 with four rollers 102. These rollers 102 ride on two arcuate rails 104 of the cylinder-shaped forward portion 16A of the torso. A chain drive 106 passes through the undercarriage 100 of the video system 12 and an opening 108 in the forward portion 16A, coupling the video system 12 to the forward portion 16A of the torso. The chain drive 106 operates to pull the video system 12 backward or forward along the rails 104, which, because of the cylinder-shape of the forward portion 16A of the torso, causes the video system 12 to tilt up or down, respectively.

In general, the robotic manipulator 10 employs distributed control architecture with independent closed-loop position servos for each joint. Specifically, each upper arm 20 includes a servomotor 110 with a speed reducing gearbox and pulley. A belt 112 couples the pulley of the motor 110 with a pulley 202 (FIG. 10) of the elbow 24. Behind each shoulder 18 is another motor 114 coupled to another pulley 172 (FIG. 8) of the shoulder 18 by a belt 116. The motors 110, 114 and belts 112, 116 can be commercial-off-the-shelf (COTS) components.

For each arm, the back portion 16B of the torso has a motor 120 coupled by a belt 122 to a pulley 164 (FIG. 8) of the shoulder 18 (only the motor 120 and belt 122 for the right arm 14-1 are visible in FIG. 3). Each belt 112, 116, and 122 is flat with integral teeth for meshing with teeth of the pulleys. In addition, the separate belts provide shock isolation. Further, a low gear ratio mechanical transmission provides manipulator backdrive-ability and low reflected inertia, mitigating the risk of damage to the robotic manipulator or to structures in the event of their collision.

The mass of the motor 110 is disposed on the opposite side of the shoulder 18 from the remainder of the arm (i.e., elbow, forearm, and wrist) to provide a counterweight that counterbalances the arm 14 approximately at the point of 3-axis-intersection within the shoulder joint. Advantageously, counterbalancing the arms enables the arms to remain in their current position when power is off; no torque needs to be applied to any of the shoulder and arm joints to hold their current positions. With the arm balanced, the expenditure of electrical power is dedicated to the movement of payload, and motor current is used to sense and hold the tool, not the arm itself.

Figure 4:
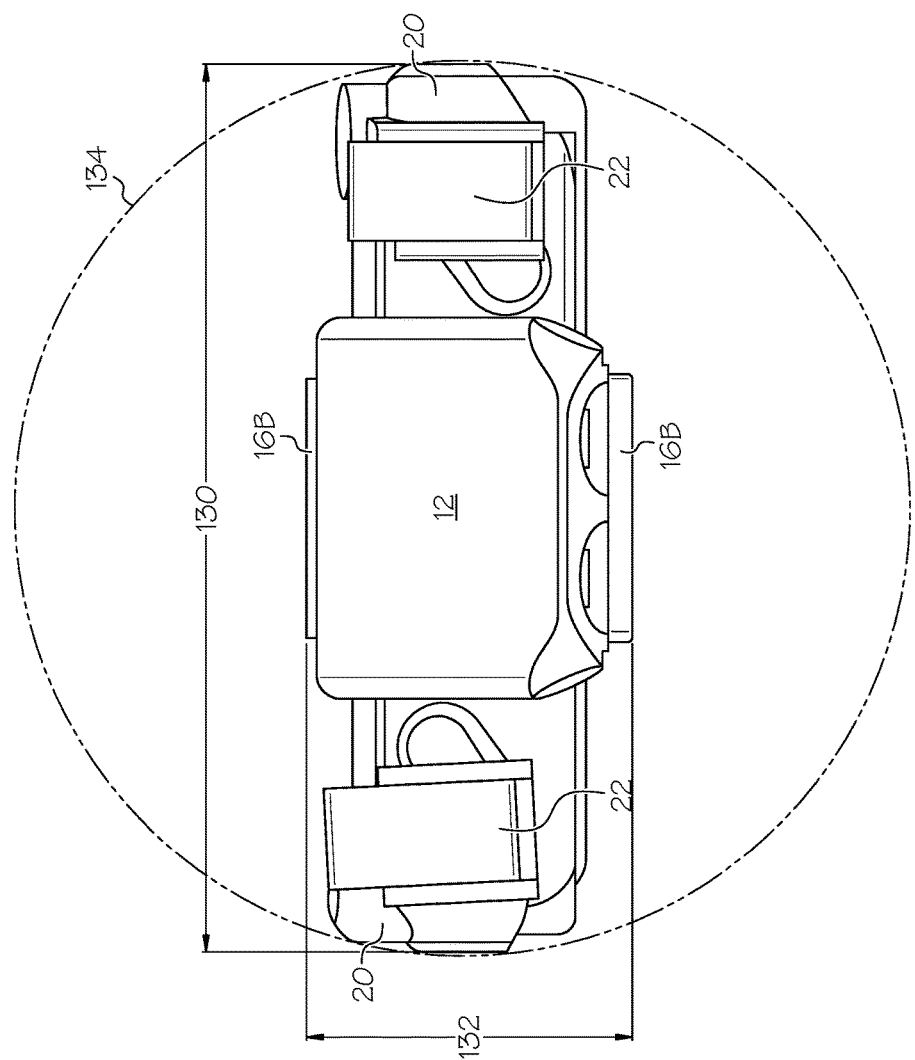
FIG. 4 is a front view of the robotic manipulator illustrating a width and height to which the robotic manipulator can fold.
Figure 5:
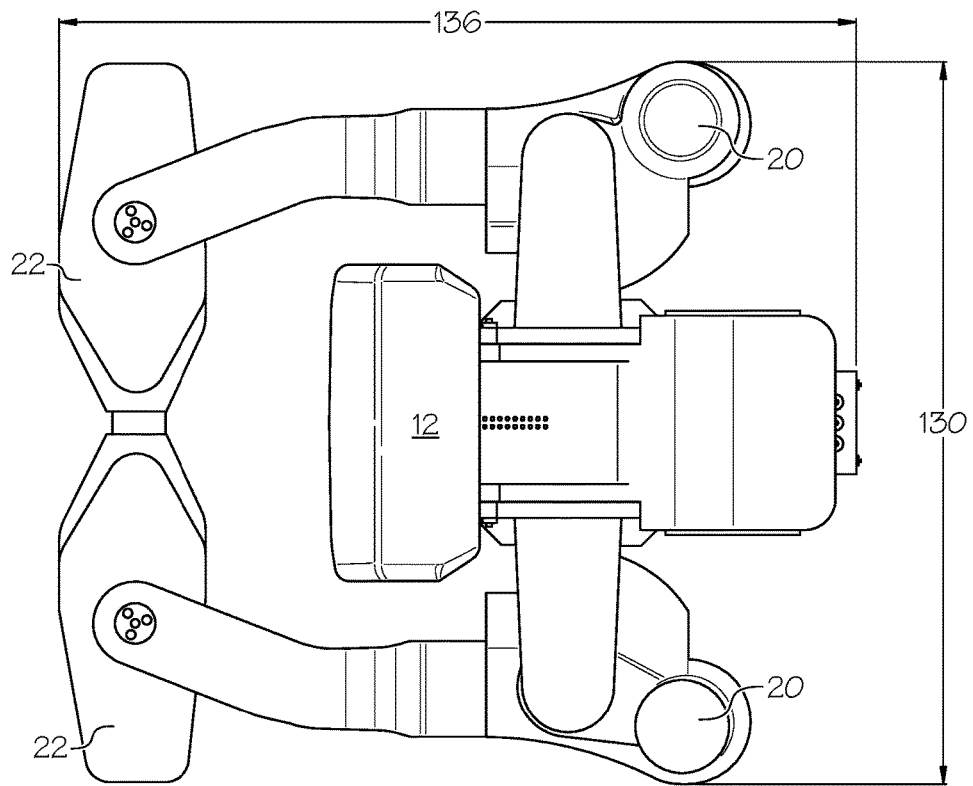
FIG. 5 is a top view of the robotic manipulator illustrating its folded width and depth.
Figure 6:
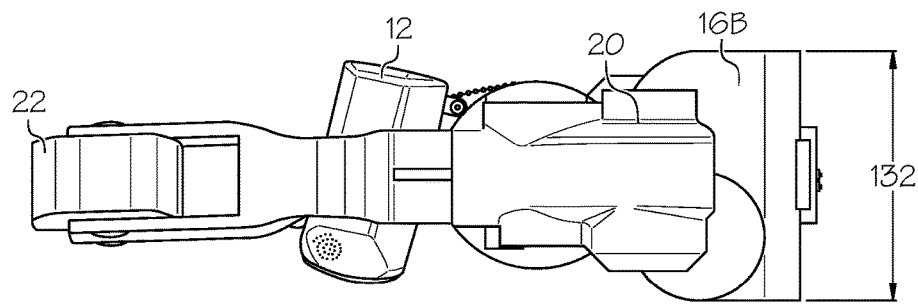
FIG. 6 is a side view of the robotic manipulator illustrating its folded height.

FIG. 4, FIG. 5, and FIG. 6 together illustrate the dimensions to which one embodiment of the robotic manipulator can fold for purposes of entering tight quarters. FIG. 4 shows a front view of the robotic manipulator 10, FIG. 5 shows a top view of the robotic manipulator, and FIG. 6 shows a side view of the robotic manipulator. In a compact folded position, the video system 12 tilts downward, and the forearms 22 extend forward of the torso 16. The compact width 130, measured from the outermost edges of the upper arms 20, is approximately 14 inches. The height 132, measured from the front edge of the back portion 16B of the torso to the back edge of the back portion 16B, is approximately 5.2 inches. The circle 134 (FIG. 4) illustrates an approximate size of a porthole into which the robotic manipulator 10 can project when brought into this compact, folded position. The diameter of such a porthole is 14.125 in. The length 136 (FIG. 5), measured from the foremost edge of the forearms 22 to the rearmost edge of the back portion 16B of the torso, is approximately 15 in. As other measures of its compactness, an embodiment of the robotic manipulator 10 can weigh as little as 5 kg and consume as little as 50 W of electrical power.

Figure 7:
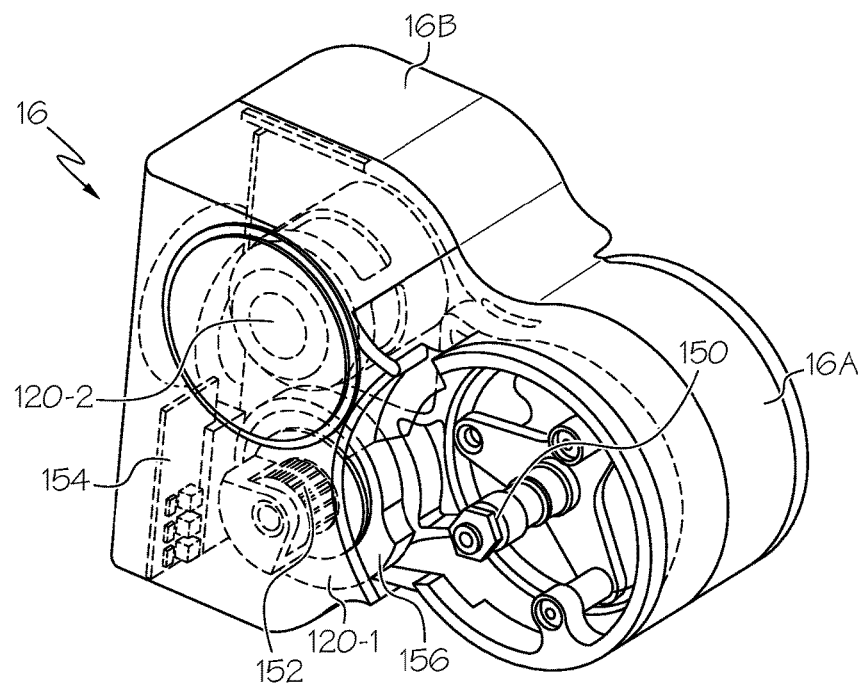
FIG. 7 is a diagram of an embodiment of a torso of the robotic manipulator.

FIG. 7 shows a diagram of an embodiment of the torso 16 of the robotic manipulator 10 including the cylinder-shaped forward portion 16A and the back portion 16B. In the description of the torso 16, reference is also made to features described in connection with FIG. 3. Housed within the back portion 16B are a pair of motors 120-1, 120-2 (generally, 120). Each motor 120 is coupled by a gearbox 156 which turns a pulley 152 (only the right pulley being shown), which is coupled by a belt 122 (FIG. 3) to a pulley 164 (FIG. 8) on the shoulder 18. The forward portion 16A includes a pair of axles 150 (only the right axle being visible), each axle 150 connecting to one of the shoulders 18. In this embodiment, the motor 120-1 rotates the right shoulder 18-1; and the motor 120-2 rotates the left shoulder 18-2.

The torso 16 also has a printed circuit board (PCB) 154 (referred to as a motion control board) for controlling the motors 120. The PCB 154 includes a servo controller, brushless motor commutation, PCM (pulse-code) modulation, closed-loop position/torque control, CANBUS communications capability, DC supply, and an incremental position encoder feedback. The PCB 154 can be implemented with a Maxon EPOS-2 Module, produced by Maxon of Sachseln, Switzerland.

The torso 16 also includes an accelerometer (not shown) that senses a direction in which the host platform (e.g., a robotic arm, mobile platform, or "jaws") is holding the robotic manipulator 10 by sensing a direction of gravity. With knowledge of the direction of gravity and the direction of the arms 14 (acquired from position encoders), the torso 16 can manipulate the motors 120 to ensure the robotic manipulator remains counterbalanced for the purposes of haptic feedback (i.e., torques needing to be applied to the joints in order for the robotic manipulator to remain in position are not used in the determination of the haptic forces displayed in the hand controllers).

Figure 8:
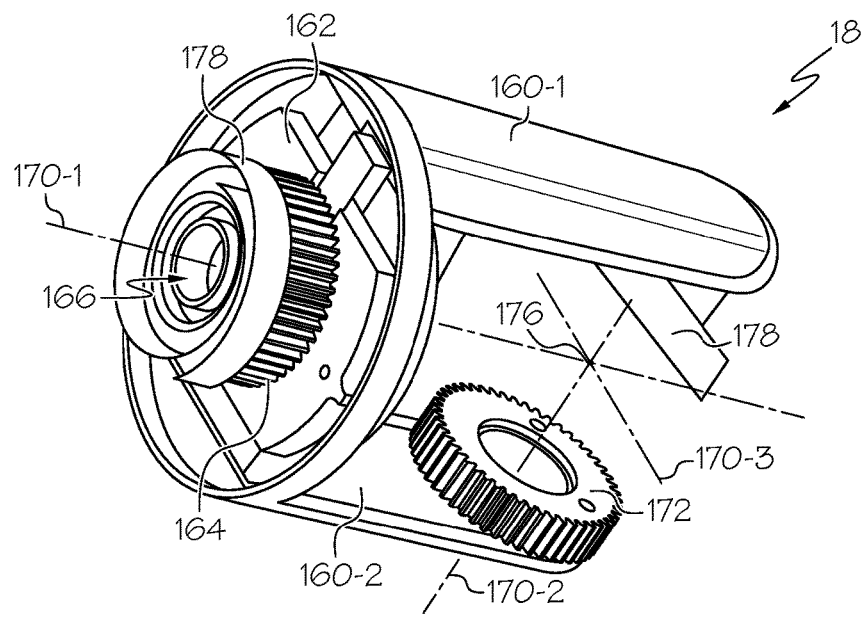
FIG. 8 is a diagram of an embodiment of a shoulder of the robotic manipulator.

FIG. 8 shows a diagram of an embodiment of each right shoulder of the robotic manipulator 10. In the description of the shoulder, reference is made to features described in connection with FIG. 3 and to the torso 16 described in FIG. 7. Each shoulder 18 includes opposing shoulder blades 160-1, 160-2 that extend orthogonally from a circular endcap 162. The end-cap 162 attaches to one side of the cylinder-shaped forward portion 16A of the torso. Fixed to the end-cap 162 is a central pulley 164 with a bearing 166 for receiving one of the axles 150 of the torso. A belt 122 fitted over the central pulley 164 couples the shoulder 18 to the pulley 152 of one of the motors 120 in the back portion 16B of the torso. Operation of the motor 120 rotates the arm 14 coupled to the shoulder 18 about the axis 170-1. Associated with each motor 120 is a position encoder so that the position of the motor (and, derivatively, the position of the shoulder) is known.

At the distal end of the shoulder blade 160-2 is a second pulley 172 with a socket 174 for receiving a bearing 194 (FIG. 9) of one of the upper arms 20. A belt 116 (FIG. 3) fitted over the pulley 172 couples the shoulder 18 to the pulley of one of the motors 114 in the upper arm 20. Operation of the motor 114 rotates the arm 14 coupled to shoulder 18 about the axis 170-2. A third axis of rotation 170-3, described further in connection with FIG. 10, intersects the other two axes 170-1, 170-2 at a point 176 within the shoulder 18.

Each shoulder 18 further includes a flex printed circuit board 178 that wraps around the socket 166, extends along a length of the shoulder blade 160-1, and depends from the distal end of the shoulder blade 160-1. This flex circuit 178 provides electrical power and digital data signals to and from the motion control PCB contained in the upper arm, elbow and instrument subsystems. The coiled design permits rotation of the robot joints throughout their designed range of motion with negligible resistance.

Figure 9:
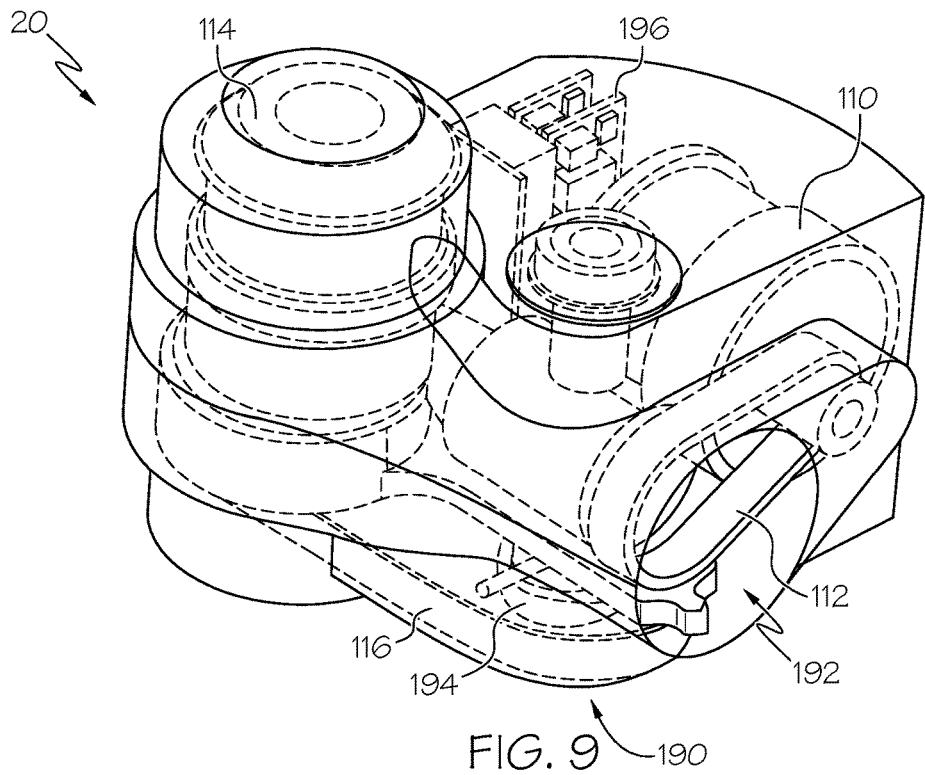
FIG. 9 is a diagram of an embodiment of an upper arm of the robotic manipulator.

FIG. 9 shows a diagram of an embodiment of each upper arm 20 of the robotic manipulator 10. In the description of the upper arm 20, reference is made to features described in connection with FIG. 3 and to the shoulder 18 described in FIG. 8. A major portion of the upper arm 20 fits closely between the two shoulder blades 160-1, 160-2 of the shoulder 18. The upper arm 20 houses the motor 114 for driving the belt 112 that engages the gear 202 of the elbow 24 (FIG. 10) and the motor 114 for driving the belt 116 that engages a gear 202 (FIG. 10) of the elbow 24.

The upper arm 20 has a first opening 190 for receiving the gear 172 and a second opening 192 for receiving a shaft 200 (FIG. 10) of the elbow 24. A rotatable shaft 194 at the opening 190 is adapted to enter closely the bearing 174 of the gear 172, thereby coupling the upper arm 20 to the shoulder 18. The shaft 194 coincides with the axis of rotation 170-2 (FIG. 8).

The upper arm 20 further comprises electronics 196 for controlling the operation of the motors 110, 114 (in response to commands). Each motor 120 has an associated position encoder so that the position of the motor (and, derivatively, a corresponding position of the upper arm) is known.

Figure 10:
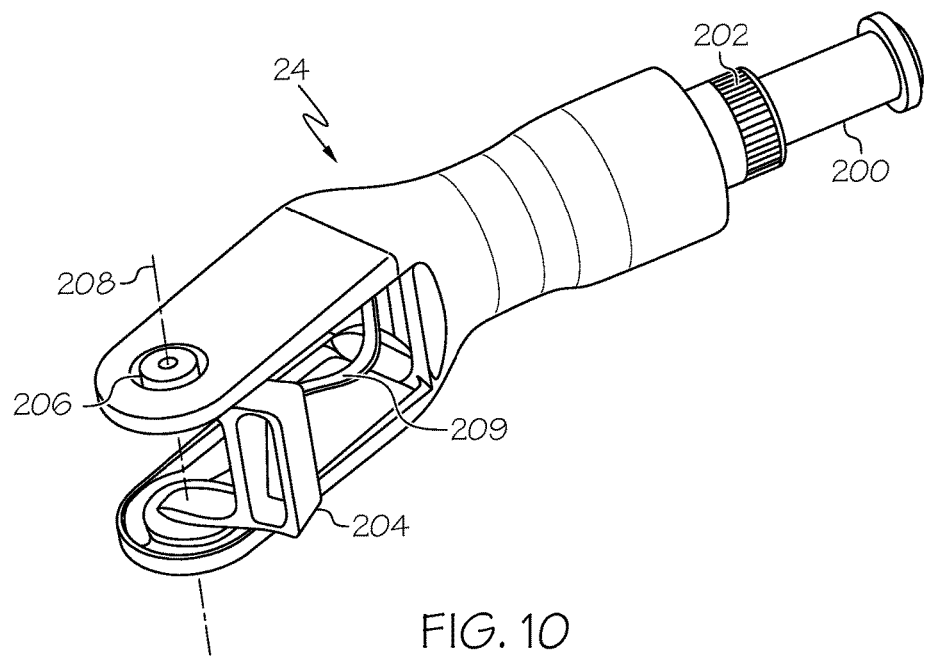
FIG. 10 is a diagram of an embodiment of an elbow of the robotic manipulator.

FIG. 10 shows a diagram of an embodiment of the elbow 24 of the robotic manipulator 10. In the description of the elbow 24, reference is made to features described in connection with FIG. 3 and to the upper arm 20 described in FIG. 9. The elbow 24 has a slight bend. At one end of the elbow 24 is a shaft 200 that enters the opening 192 (FIG. 9) in the upper arm 20 and a gear 202 that engages the belt 112. At the forked end of the elbow 24 is a forearm-mount 204 movably connected to a joint 206. Connected to this joint 206, the mount 204 can rotate about the axis 208. A flex circuit 209 wraps around the joint 206, runs along an interior surface of the forked end, and enters the body of the elbow 24. The flex circuit 209 is electrically connected to the flex circuit 178, and carries electrical power and digital communication signals to and from motor control PCBs 216 contained within the forearm main housing 210 (FIG. 11) and accelerometer and angle position sensors contained in the wrist 26 (FIG. 11).

Figure 11:
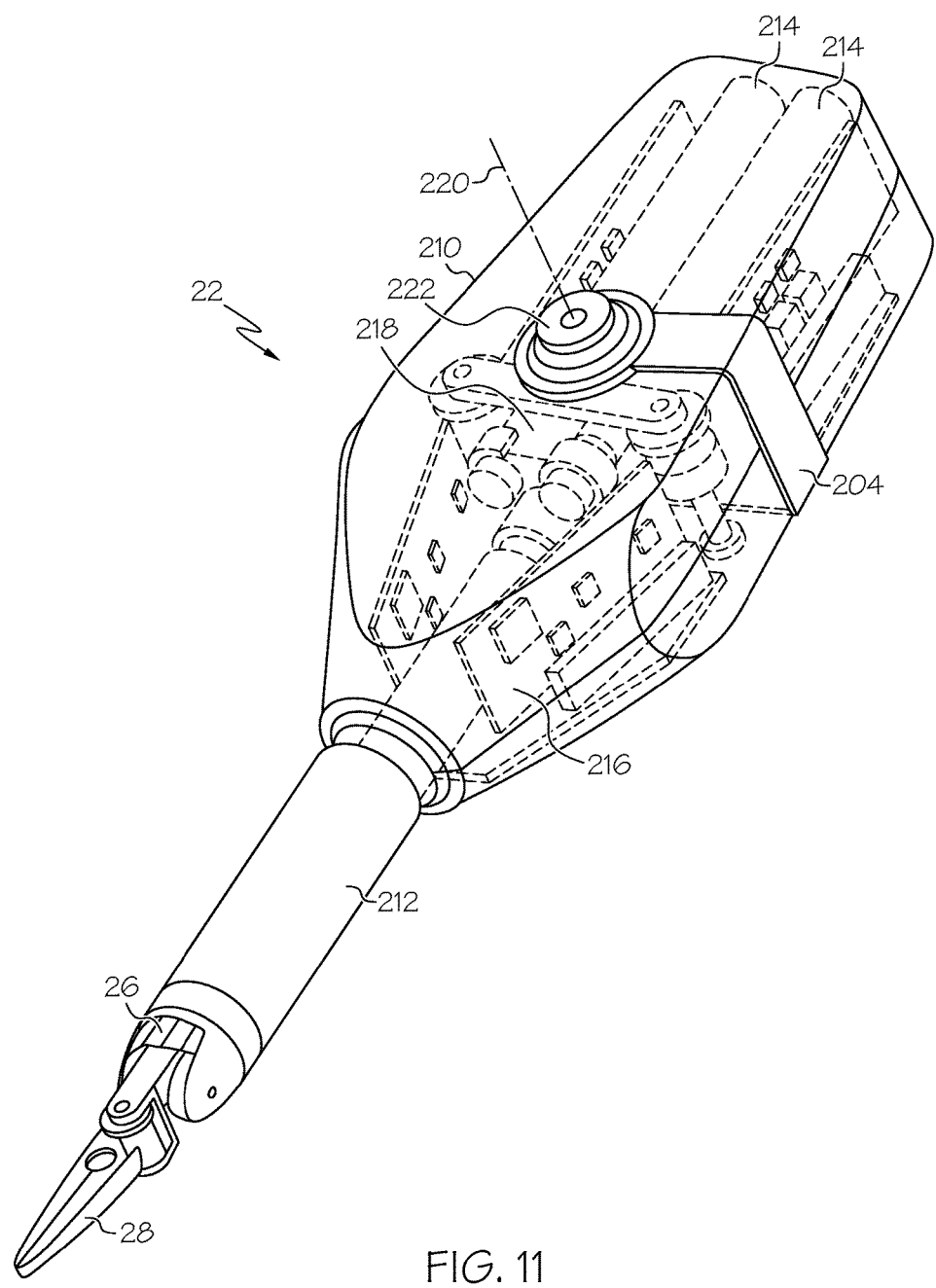
FIG. 11 is a diagram of an embodiment of a forearm of the robotic manipulator

FIG. 11 shows a diagram of an embodiment of the forearm 22 of the robotic manipulator 10. In the description of the forearm 22, reference is made to features described in connection with FIG. 3 and to the elbow 24 described in FIG. 10. The forearm 22 has a main housing 210 and a tube-shaped portion 212 that extends from one end of the housing 210. The tube-shaped portion 212 ends at the wrist 26.

Within the housing 210 are four electromagnetic brushless motors with gear reductions 214, printed circuit boards 216, and a cable drive mechanism 218 that rotationally moves the tube shaped portion 212, the wrist 26 and gripper 28 in reaction to rotations of the electric motors 214. The electric motors 214 may optionally be equipped with high-resolution rotational position sensors, or may be used without such sensors by employing hall-effect sensors within the motor as coarse resolution rotational position sensors. The motors 214, PCBs 216, and cable drive system 218 are positioned within the housing 210 where they can counterbalance the mass of the tube-shaped 212 and wrist 26. The design of the forearm 22 is for its center of mass to be within the housing 210 on the axis 220 passing through the forearm joint 222.

Mechanical features of the cable drive mechanism 218 separably connect to the forearm-mount 204 (FIG. 10) of the elbow 24. The forearm mount 204 is connected to the both ends of the joint 206 of the elbow 24. When the forearm 22 is attached to the elbow 24, the axes 208 (FIG. 10), 220 align. When the forearm 22 moves, it rotates about the forearm joint 222, which aligns with its center of mass; accordingly, the forearm 22 remains balanced throughout its three-dimensional range of movement.

Attached to the wrist 26 are two gripper jaws 28. The jaws 28 can move up and down across a plus or minus 90-degree range, and open and close for cutting and grasping operations. The electronics 216 control the movement of the tool 28. A four-cable actuator (not shown), which extends from the housing 210 of the forearm 22 through the tube-shaped portion 212 into the wrist 26, executes the yaw, pitch, open, and close movements of the tool 28.

Figure 12:
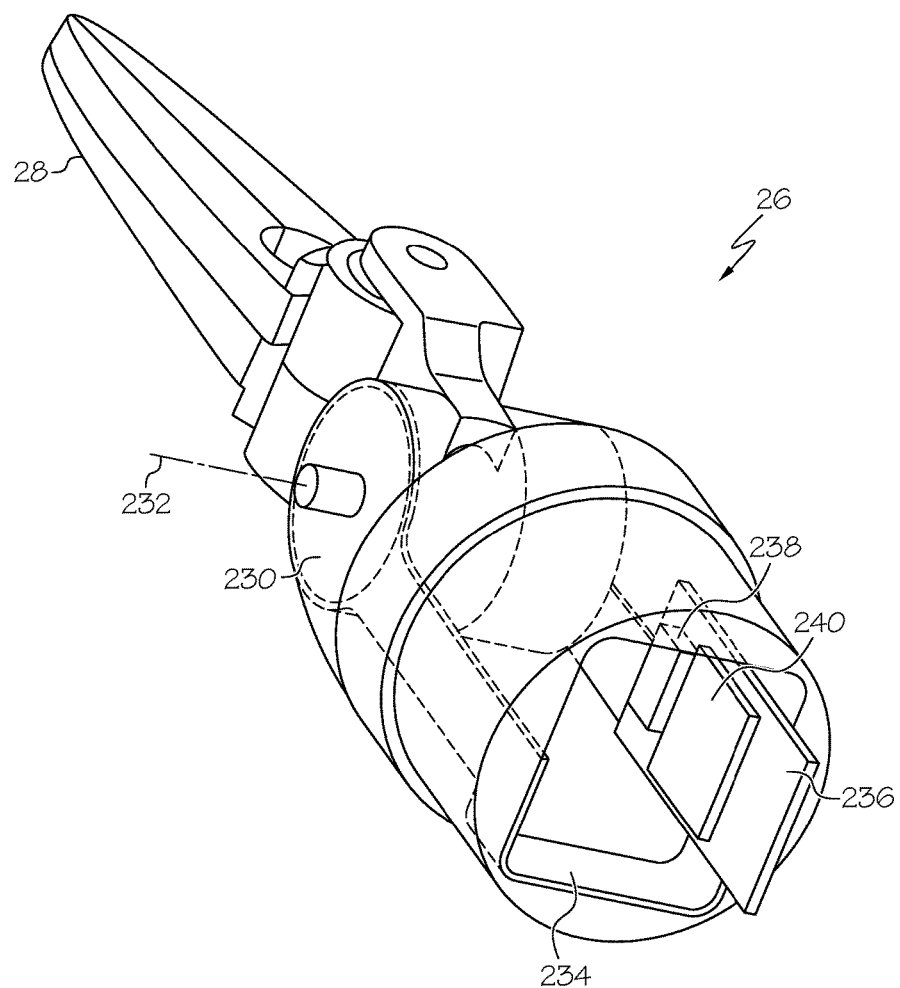
FIG. 12 is a diagram of an embodiment of a wrist of the robotic manipulator.

FIG. 12 shows a diagram of an embodiment of the wrist 26 of the robotic manipulator 10. The wrist 26 is connected to the tool 28 at a rotatable wrist joint 230. The robotic manipulator 10 can accordingly roll its furthermost joint, the wrist joint 230 allowing the tool 28 to move plus or minus 90 degrees about the axis 232. The wrist 26 also includes a flex circuit 234 connected to both ends of the wrist joint 230 and to a printed circuit board (PCB) 236. The flex circuit 234 carries digital electrical signals from two angular position sensors within the wrist joint 230. These signals encode data relating to the angular position of each of the gripper jaws 28.

The PCB 236 includes a surface-mounted 3-axis accelerometer 240 for detecting vibration, thus providing vibrotactile feedback in three dimensions. The PCB 236 further contains a surface mount capacitance sensing circuit connected to flex circuit 234. These surface mounted IC's communicate digital electrical signals over I2C or similar interfaces. The wrist 26 also includes wires (not shown) to the tip of the tool for sensing differences in electrical potential (voltage) between objects in contact with the grippers of the right and left manipulator, or the electrical current flowing through a wire being held between the gripper jaws 28. A sensor (e.g., capacitive angular sensor 230) senses and communicates the relative position of the tool 28 to the computational subsystem for processing into haptic control signals. This joint-position sensing is independent of the motor position sensors. In one embodiment, the PCB 236 communicates the data acquired by the accelerometer 240 and the sensed joint position to the arm 14 over an I²C bus.

Figure 13:
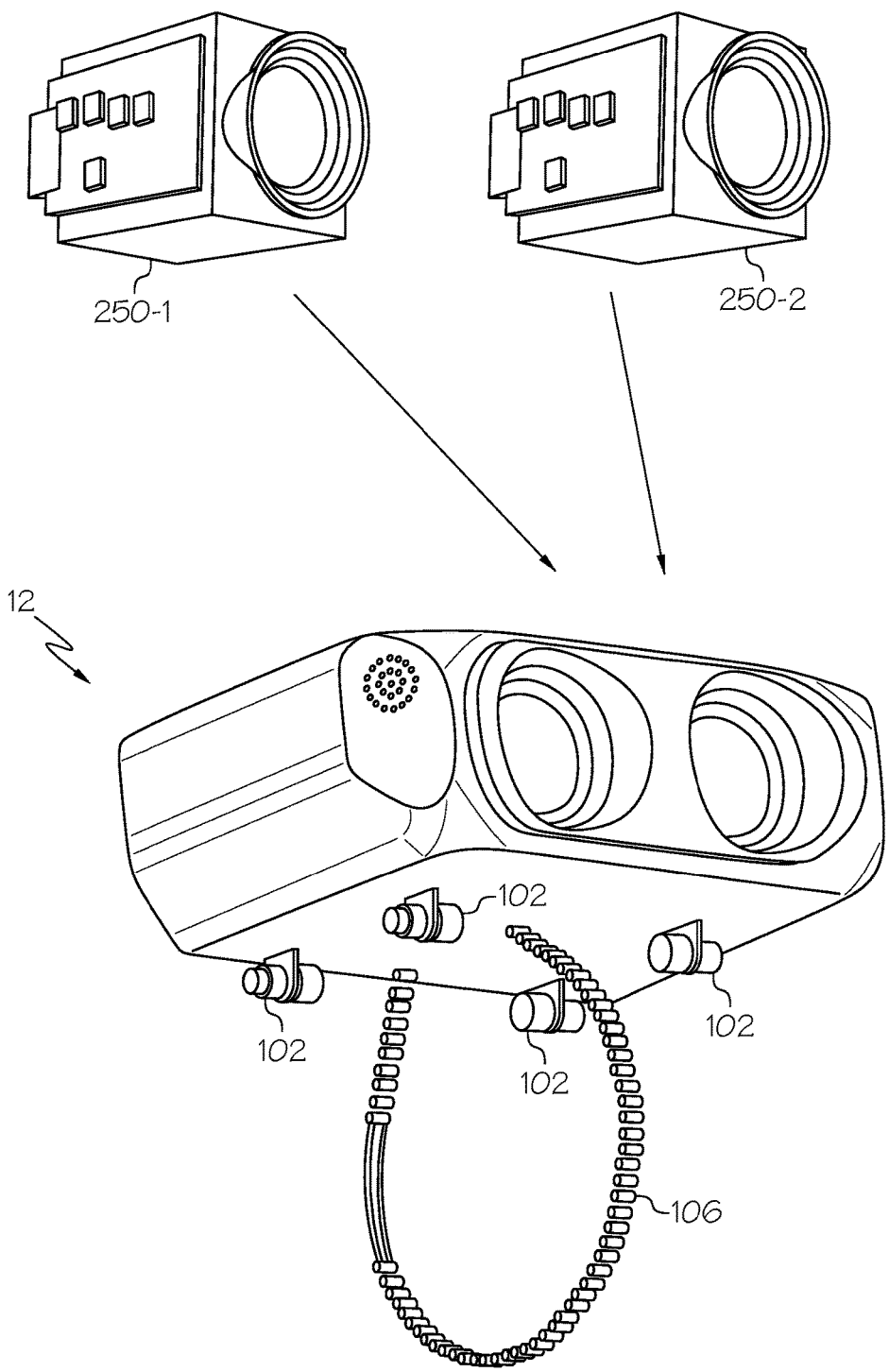
FIG. 13 is a diagram of an embodiment of the stereoscopic video system of the robotic manipulator.

FIG. 13 shows a diagram of an embodiment of the stereoscopic video system 12 of the robotic manipulator 10, including the chain drive 106 and the four rollers 102. The video system 12 includes two high definition (1080i or 720p) block camera modules 250-1, 250-2 (generally, 250), with low light capability, auto focus, auto iris, a remote digital interface for configuration, zoom, and focus, and a component video output. In one embodiment, the field of vision for the camera modules 250 is 50 degrees (wide angle) and 5.4 degrees (telephoto). These angles may be increased through the use of external wide angle adapters that attach to the cameras 250.

Video subsystem 12 further includes an interface card (not shown) for access to data communication, a camera pitch (tilt) servo, a stereo microphone preamplifier, and a video encoder (e.g., a Teredek Cube by Teredek of Irvine Calif.) for performing low-latency video compression (e.g., H.264), stereo audio compression, and Ethernet transmission. The camera pitch servo pulls the video system 12 along the chain drive 106 to tilt the video system 12 up and down. When the video system 12 is tilted downwards through 90 degrees, rotating the robotic manipulator 10 causes the binocular view to turn left and right (such rotation being performed by the host robotic arm to which the robotic manipulator 10 is attached). The view direction of the camera affects the direction of movement of the robotic arms and hands (i.e., tools). For example, if the camera direction is tilted downwards, the arms move downward in response to a reaching-forward movement of the hand controls by the operator at the remote control station—there is a remapping of the operator's coordinate system to the coordinate system of the binocular view.

Reference in the specification to "one embodiment" or "an embodiment" means that a particular, feature, structure or characteristic described in connection with the embodiment is included in at least one embodiment of the teaching. References to a particular embodiment within the specification do not all necessarily refer to the same embodiment. The terminology used herein is for the purpose of describing particular embodiments only and is not intended to be limiting of the invention.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

While the invention has been shown and described with reference to specific preferred embodiments, it should be understood by those skilled in the art that various changes in form and detail may be made therein without departing from the spirit and scope of the invention as defined by the following claims.

What is claimed is:

1. A robotic manipulator comprising:
a remotely controlled mobile host platform;
a body attached to the remotely controlled mobile host platform;
a stereoscopic video system movably coupled to the body, the stereoscopic vision system producing a stereoscopic video of an environment of the robotic manipulator; and
two independently remotely controlled arms coupled to opposite sides of the body, each arm moving in a direction determined by proprioceptive alignment with a view direction of the stereoscopic video produced by the stereoscopic vision system in response to commands received from a remote control station based on movements performed by an operator at the remote control station;
wherein each arm comprises an upper arm rotatably coupled to one side of the body for rotational movement about first and second axes, an elbow rotatably joined to the upper arm for rotational movement about a third axis, the three axes of rotation intersecting at a point within the upper arm;
and wherein each arm comprises a forearm rotatably joined to the elbow of that arm for rotational movement about an elbow joint, the forearm having a center of mass at the elbow joint to balance the forearm at the elbow joint.

2. The robotic manipulator of claim 1, wherein the body further comprises an accelerometer for detecting a direction of gravity, and the robotic manipulator further comprises a computational subsystem that balances the arms of the robotic manipulator in response to the detected direction of gravity and position of the arms.

3. The robotic manipulator of claim 1, wherein the body has rails and the video system has an undercarriage with rollers that ride on the rails of the body, and the robotic manipulator further comprises a chain drive coupling the video system to the body and a servo that moves the video system along the chain drive to tilt the video system up and down.

4. The robotic manipulator of claim 1, wherein each forearm comprises a wrist adapted to hold an instrument.

5. The robotic manipulator of claim 4, wherein each upper arm comprises a first servo that rotates the upper arm about one of the first and second axes and a second servo that rotates the upper arm about the other of the first and second axes, the servos being disposed within the upper arm at locations where the servos provide a counterbalance to a remainder of the arm.

6. The robotic manipulator of claim 1, wherein each arm comprises a rotatable wrist with a tool, the wrist having a three-axis accelerometer that detects and reports vibrations in three dimensions.

7. The robotic manipulator of claim 6, wherein the wrist further comprises means for detecting a degree of grip opening by the tool.

8. A system comprising:
a remotely controlled mobile host platform; and
a robotic manipulator attached to the remotely controlled mobile host platform, the robotic manipulator comprising:
  a servo actuator subsystem including two independently remotely controlled arms coupled to opposite sides of a body;
    each arm of the robotic manipulator comprising an upper arm rotatably coupled to one side of the body for rotational movement about first and second axes, an elbow rotatably joined to the upper arm for rotational movement about a third axis, the three axes of rotation substantially intersecting at a joint within the upper arm; and
    each arm comprising a forearm rotatably joined to the elbow of that arm for rotational movement about an elbow joint, the forearm having a center of mass at the elbow joint to balance the forearm at the elbow joint;
  a video-capture subsystem that produces a stereoscopic video of a local environment of the robotic manipulator; and
  a computational host subsystem transmitting movement commands to the servo actuator subsystem that cause the servo actuator subsystem to move each arm in a direction determined by proprioceptive alignment with a view direction of the stereoscopic video produced by the video-capture subsystem.

9. The system of claim 8, further comprising a remote control station having haptic-interface devices, the remote control station sending movement commands to the computational host subsystem of the robotic manipulator over a network in response to manipulation of the haptic-interface devices by an operator.

10. The system of claim 9, wherein the computational host subsystem transmits feedback signals received from the servo actuator subsystem and video data received from the video-capture subsystem to the remote control station.

11. The system of claim 10, wherein at least some of the feedback signals correspond to vibrations detected in three dimensions by wrists of the arms.

12. The system of claim 10, wherein at least some of the feedback signals correspond to a sense of grip effort being exerted by a tool held by a wrist of one of the arms.

13. The system of claim 8, wherein the computational host subsystem balances the arms of the robotic manipulator in response to a detected direction of gravity and position of the arms.

14. The system of claim 8, wherein the robotic manipulator further comprises a power distribution subsystem that distributes power acquired from the remotely controlled mobile host platform to the other subsystems of the robotic manipulator.

15. The system of claim 8, wherein the remotely controlled mobile host platform has a manipulator arm with a gripper at a distal end of the manipulator arm, and wherein the robotic manipulator is in the gripper at the distal end of said manipulator arm.

16. The system of claim 8, wherein each upper arm comprises a first servo that rotates the upper arm about one of the first and second axes and a second servo that rotates the upper arm about the other of the first and second axes, the servos being disposed within the upper arm at locations where the servos provide a counterbalance to a remainder of the arm.

17. The system of claim 8, wherein each forearm comprises a wrist adapted to hold a tool.

18. The robotic manipulator of claim 1, wherein the remotely controlled mobile host platform is a remotely controlled vehicle.

19. The system of claim 8, wherein the remotely controlled mobile host platform is a remotely controlled vehicle.

* * * * *